United States Patent [19]
Ligh

[11] Patent Number: 5,671,952
[45] Date of Patent: Sep. 30, 1997

[54] SERVICE MANIFOLD AND SPECIAL ELBOW FOR TANK BLANKETING AND VENTING VALVES

[76] Inventor: Jone Yen Ligh, P.O. Box 420509, Houston, Tex. 77242-0509

[21] Appl. No.: 401,948

[22] Filed: Mar. 10, 1995

[51] Int. Cl.[6] .................................................. F16L 35/00
[52] U.S. Cl. ........................... 285/27; 285/131; 285/179; 285/286; 285/363; 285/177; 285/156
[58] Field of Search .............................. 285/131, 27, 132, 285/133.1, 152, 153, 192, 179, 286, 363, 177, 156

[56] References Cited

U.S. PATENT DOCUMENTS

| | | | |
|---|---|---|---|
| 165,724 | 7/1875 | Gibson | 285/132 |
| 791,326 | 5/1905 | Dale | 285/192 X |
| 892,151 | 6/1908 | Hanlon | 285/132 |
| 1,064,001 | 6/1913 | O'Dowd | 285/132 |
| 1,304,197 | 5/1919 | Nyqilist | 285/131 |
| 1,321,235 | 11/1919 | McCann | 285/131 |
| 2,588,983 | 3/1952 | Johnson | 285/210 |
| 2,707,967 | 5/1955 | Adams et al. | 285/192 X |
| 4,103,936 | 8/1978 | Sutcliffe et al. | 285/26 |
| 4,681,684 | 7/1987 | Maroschak et al. | 285/153 X |
| 4,718,568 | 1/1988 | Palu | 220/86 |
| 4,991,620 | 2/1991 | Ligh | 137/489 |
| 5,067,522 | 11/1991 | Ligh | 137/625.33 |

FOREIGN PATENT DOCUMENTS

| | | | |
|---|---|---|---|
| 792988 | 1/1936 | France | 285/131 |
| 208409 | 4/1940 | Switzerland | 285/132 |
| 2204102 | 11/1988 | United Kingdom . | |

OTHER PUBLICATIONS

Appalachian Control Co., "Meeting EPA Emission Standards with Pad–Depad Tank Blanketing" 1991.
Fisher Controls "Gas Blanketing and Vapor Recovery. Saving and Safety." Nov. 1991.
Appalacian Controls Co., "General Sales Info. Single Array Manifold (SAM) Unit," Feb. 1989.
Anderson Greenwood & Co "AGCO Trans–Zero Regulations for Tank Blanketing Service" Catalog 7000, Feb. 1982.

*Primary Examiner*—Dave W. Arola
*Attorney, Agent, or Firm*—Kenneth H. Johnson

[57] ABSTRACT

A manifold with provisions for blanket gas entry, vapor exhaust, and sensing port(s) for mounting on a single nozzle on the tank comprising a special elbow seated through an opening in a main pipe and having a thickened portion and a stop to make a tight seat in an opening in the main pipe and a flow pipe with connections to suit the mating equipment (flanges, thread, or a combination thereof).

10 Claims, 1 Drawing Sheet

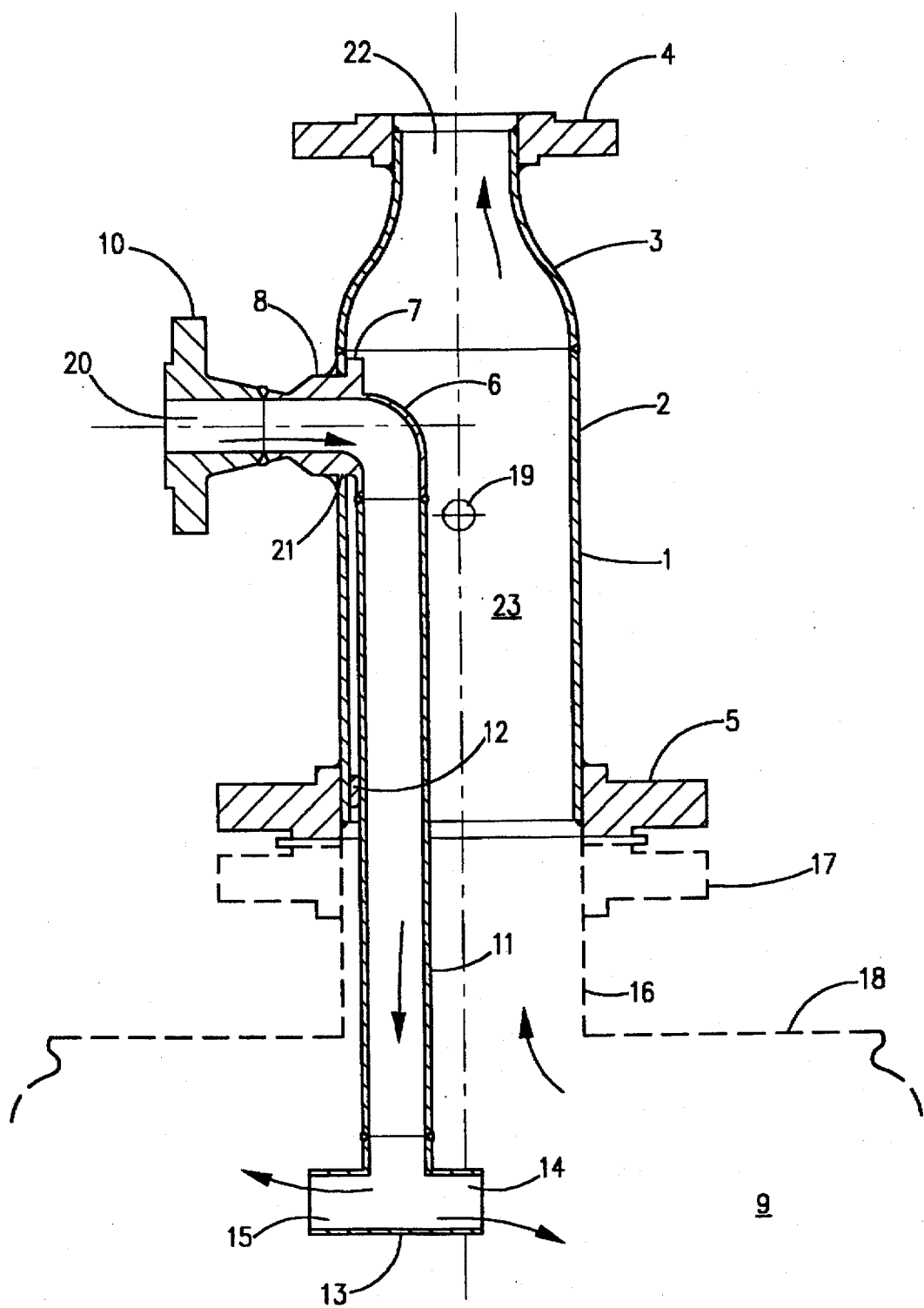

SERVICE MANIFOLD AND SPECIAL ELBOW FOR TANK BLANKETING AND VENTING VALVES

BACKGROUND OF THE INVENTION

1. Field of the Invention

The present invention relates to a manifold for use on storage tanks to allow for dual use of a single port.

2. Related Art

Most liquid storage tanks must have a pressure relieving device installed to protect the tank from being overpressurized. Additionally, many storage tanks are "blanketed", usually with an inert type of gas such as nitrogen, for one of several reasons: (1) to prevent the entrance of atmospheric air which contains oxygen, moisture, and other contaminants that could cause internal tank corrosion and degradation of the stored product, (2) to dilute the oxygen content in the vapor space of the tank so that the vapors are below the flammable range (too lean to burn), (3) to enrich the vapors so that they are above the flammable range (too rich to burn), (4) to dilute toxic vapors for safer emission levels, (5) to prevent the collapse of the tank when atmospheric thermal conditions tend to cool the tank walls and cause a drop in internal pressure, and for other reasons.

Some tanks have a vapor recovery system whereby the vapors are piped to a recycling compressor and returned to a liquid state. All of the above described systems require an entry and an exit to the tank. Two ports are usually used in addition to separate ports for pilot sense lines and accessory equipment. Some systems use one port for both the entry and exit.

Some systems use one port on the tank for both the entry of the blanket gas and the outlet for the vapors to the vapor recovery system. Another approach is the use of two ports on a tank for blanketing, one port for blanket gas entry and one port for the control line.

A system previously used by the present inventor provides for a blanket gas entrance and a sensing point through the same nozzle on the tank. There are no provisions for venting the vapors.

Some of the prior systems can perform two of the three needed functions, but have no provisions to exhaust the tank vapors. Other prior systems using a tee can accommodate both blanket gas entry and vapor exhaust but the tee is not a good location for sensing tank pressure. Additionally, if a "weight loaded" exhaust valve is used for vapor recovery, with the prior systems it can open prematurely (before the actual set point is reached) because the potential exists for the blanket gas to enter the tee at a much higher pressure than the set pressure of the exhaust valve, thus causing the exhaust valve to open prematurely.

It is an advantage of the present invention that the manifold can accommodate (1) the entry of the blanket gas, (2) the exhaust of the vapors, and (3) sensing point(s) to pick up the true tank pressure, all available in a single unit for mounting on a single port on the tank.

SUMMARY OF THE INVENTION

The current invention is an elbow and a manifold in combination with the elbow that provides for blanket gas entry, vapor exhaust, and sensing port(s) for mounting on a single nozzle on the tank. The manifold comprises a main pipe, a special elbow and a flow pipe with connections to suit the mating equipment (flanges, thread, or a combination thereof).

Briefly the elbow of the present invention comprises a pipe having a 90° bend forming an inner arc and an outer arc, a first end adapted to extend through an opening in the wall of a linear main pipe, said first end having a thickened portion for engagement in said opening said thickened portion serving to reduce the arc of the bend and allow for a tight seating of the elbow in said opening and a stop on the outer arc aligned with the end of the reduced arc. A second end of the elbow is adapted to extend inside the main pipe along the wall.

The service manifold comprises: a substantially linear main pipe having an entry and an exit at opposite ends thereof and an auxiliary pipe extending internally into said main pipe intermediate of said entry and said exit, said pipe comprising a pipe having a 90° bend forming an inner arc and an outer arc, a first end adapted to extend through an opening in the wall of said main pipe, said first end having a thickened portion for engagement in said opening said thickened portion serving to reduce the arc of the bend and allow for a tight seating of the elbow in said opening and a stop on the outer arc aligned with the end of the reduced arc.

The purpose of the internal pipe is to provide an entry for the tank blanketing gas. The sizing of the internal pipe for this use is to allow the blanketing gas to enter at a reasonable velocity, but at the same time the internal pipe is kept as small as possible in order to leave the main pipe open for emergence pressure relief from the tank. Preferably the internal pipe has a cross sectional area of less than 50% of said main pipe.

BRIEF DESCRIPTION OF THE DRAWINGS

The FIGURE is a cross sectional elevational view of one embodiment of the present manifold and elbow.

PREFERRED EMBODIMENT

The special elbow 6 of the instant invention has a round shank 8 that is larger in diameter than the diameter of mating pieces 10 or 11. The larger diameter at 8 will allow a round hole to be drilled in main pipe 2 with more ease than the need for an irregular shaped hole. the horizontal portion of special elbow 6 is made longer than standard elbows to extend outward from the main pipe 2 to allow easier welding and attachment of connecting flanges or fittings. Special elbow 6 also has a stop 7 to automatically and properly locate the elbow against the main pipe 2. The brace-spacer 12 is welded between main pipe 2 and flow pipe 11 for added rigidity. The tee 13 is optional. The flow may flow straight downward out of flow pipe 11 (without the tee 13), or, flow out of entry ports 14 and 15 of tee 13 and into the tank 9.

The key to the manifold shown in the FIGURE is the pressure drop along the manifold between the flange at the lower end for mounting to the tank nozzle and the flange at the upper end for mounting the pressure relieving device. Ideally the pressure drop from the tank connection to the relieving device connection should not be greater than three percent (3%) in order to avoid the need to oversize the pressure relieving device. See ASME Section VIII, Division 1 of the Unfired Pressure Vessel Code. Although the ASME Section VIII currently deals with vessels with a design pressure greater than 15 psig it is a prudent practice to apply the three percent rule to pressure vessels designed for operating below 15 psig as well. Because minimum pressure drop is desired through the manifold for pressure relieving, and because the lower end of the manifold is partially obstructed by the pipe for the blanket gas, the lower flange and pipe size will usually be slightly larger than the flange and pipe size at the upper end for mounting the pressure relieving device.

Pressure drop along the blanket gas entry pipe is not as critical since the blanket gas entry pressure is much higher than the set pressure of the relieving device.

Operation of the Manifold

Referring to the FIGURE, the blanket gas enters the manifold 1 via entry port 20. Utility port 19 on the main pipe 2 senses the pressure in the vapor space of tank 9 and relays the pressure to the blanketing valve (not shown). If the pressure sensed is equal to or greater than the set pressure of the blanketing valve, the blanketing valve will remain closed. When the vapor space pressure drops below the set pressure of the blanketing valve, the blanketing valve will open and discharge blanket gas into the tank via flow pipe 11. When pressure in the vapor space reaches the set pressure of the blanketing valve the blanketing valve will close.

When pressure in the vapor space of tank 9 reaches the set pressure of the vent valve (not shown), excess vapor pressure will be vented through passageway 22 at the top of the manifold.

When sufficient pressure in the vapor space has been vented and the pressure falls to or below the reseat point of the vent valve, the vent valve will close.

Referring to the FIGURE, the reason for locating the flow pipe 11 close to one side of the main pipe 2 is to minimize the obstruction of passage 23 when fluid is flowing from the tank 9 towards exit 22 at the top of the manifold. Currently by the prior art, to fabricate a manifold similar to the one shown in the FIGURE by using standard pipe fittings and elbows would require a hole in the side of main pipe 2 at location 21 to be an irregular shape in order to accommodate the radius at the lower side of the elbow, thereby adding difficulty to the fabrication process.

The invention claimed is:

1. An elbow comprising a pipe having a 90° bend forming an inner arc and an outer arc portion, a first end extending through an opening in the wall of a linear main pipe, said first end having a shank of enlarged outer diameter relative to the diameter of said inner and outer arc portion and forming a junction therewith fixedly engaged in said opening, said enlarged outer diameter serving to reduce the arc of the bend and allow for a tight seating of the elbow in said opening and a stop on said outer arc abutting said wall and aligned with the said junction of said enlarged outer diameter and said outer arc.

2. The elbow according to claim 1 wherein a second end of the elbow extends inside the main pipe along the wall.

3. The elbow according to claim 1 wherein said stop cooperates with the internal wall of the main pipe.

4. A service manifold comprising: a substantially linear main pipe having an entry and an exit at opposite ends thereof and an auxiliary pipe extending internally into said main pipe intermediate of said entry and said exit, said auxiliary pipe having a 90° bend forming an inner arc and an outer arc portion, a first end extending through an opening in the wall of said main pipe, said first end having a shank of enlarged outer diameter relative to the diameter of said inner and outer arc portion and forming a junction therewith fixedly engaged in said opening, said enlarged outer diameter serving to reduce the arc of the bend and allow for a tight seating of the elbow in said opening and a stop on said outer arc abutting said wall and aligned with the said junction of said enlarged outer diameter and said outer arc.

5. The service manifold according to claim 4 wherein a second end of the auxiliary pipe extends inside the main pipe along the wall.

6. The service manifold according to claim 4 wherein said stop cooperates with the internal wall of the main pipe.

7. The service manifold according to claim 4 wherein the internal pipe has a cross sectional area of less than 50% of said main pipe.

8. The service manifold according to claim 4 wherein said auxiliary pipe extends externally of said main pipe.

9. The service manifold according to claim 8 wherein a portion of said auxiliary pipe is substantially linear and extends internally adjacent to the inner surface of the main pipe.

10. The service manifold according to claim 4 wherein said auxiliary pipe and said main pipe are substantially cylindrical.

* * * * *